United States Patent
Boss et al.

(10) Patent No.: US 10,454,990 B2
(45) Date of Patent: *Oct. 22, 2019

(54) DYNAMICALLY ADJUSTING QUALITY OF SERVICE USING COGNITIVE FOCUS OF ATTENTION DETECTION

(71) Applicant: International Business Machines Corporation, Armonk, NY (US)

(72) Inventors: Gregory J. Boss, Saginaw, MI (US); Christopher J. Dawson, Arlington, VA (US); Rick A. Hamilton, II, Charlottesville, VA (US); James R. Kozloski, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,109

(22) Filed: May 1, 2018

(65) Prior Publication Data

US 2018/0248930 A1 Aug. 30, 2018

Related U.S. Application Data

(63) Continuation of application No. 14/696,916, filed on Apr. 27, 2015, now Pat. No. 10,009,405.

(51) Int. Cl.
*G06F 15/173* (2006.01)
*H04L 29/06* (2006.01)
*H04L 12/26* (2006.01)

(52) U.S. Cl.
CPC .......... *H04L 65/80* (2013.01); *H04L 43/0894* (2013.01); *H04L 65/403* (2013.01); *H04L 43/16* (2013.01)

(58) Field of Classification Search
CPC .... H04L 65/80; H04L 43/0894; H04L 65/403
(Continued)

(56) References Cited

U.S. PATENT DOCUMENTS 6,453,336 B1 * 9/2002 Beyda ..................... H04L 29/06
709/204
6,584,177 B2 * 6/2003 Rizzi ................... H04M 3/2227
379/1.03
(Continued)

FOREIGN PATENT DOCUMENTS

WO 2013171365 11/2013

OTHER PUBLICATIONS

Cisco IOS Release; Service Selection Gateway Hierarchical Policing; Retrieved from the Internet Oct. 13, 2014; URL: http://tinyurl.com/n8fmbfu; 20 pages.
(Continued)

*Primary Examiner* — Atta Khan
(74) *Attorney, Agent, or Firm* — Schmesier, Olsen & Watts; Mark C. Vallone

(57) ABSTRACT

An approach is provided for managing a quality of service (QoS). It is determined that a user communicates with a first video conference participant and no other participant(s). A cognitive focus of attention model is generated. The cognitive focus of attention is a region of a display presenting the video conference that includes a face of the first participant. The model specifies a peripheral vision resolution of the user. First and second actual QoS of other regions and the region, respectively, are generated. Based on the model and the first and second actual QoS, an adjustment to the first actual QoS is determined, without adjusting the second actual QoS, and while maintaining unchanged a perceived QoS. A resolution of the other regions is matched to the peripheral vision resolution by delaying or dropping packets
(Continued)

that specify the other regions, which reduces a video bit rate of the other regions.

4 Claims, 7 Drawing Sheets

(58) Field of Classification Search
USPC .................................................. 709/223
See application file for complete search history.

(56) References Cited

U.S. PATENT DOCUMENTS

| | | | | |
|---|---|---|---|---|
| 6,640,248 | B1* | 10/2003 | Jorgensen | H04L 1/20 370/328 |
| 6,750,880 | B2* | 6/2004 | Freiberger | G09F 27/00 709/218 |
| 6,909,921 | B1* | 6/2005 | Bilger | G05B 15/02 700/14 |
| 7,324,551 | B1* | 1/2008 | Stammers | H04L 47/10 370/230 |
| 8,654,971 | B2 | 2/2014 | Orsini et al. | |
| 2003/0052911 | A1* | 3/2003 | Cohen-solal | H04L 29/06027 715/738 |
| 2008/0194925 | A1 | 8/2008 | Alsafadi et al. | |
| 2012/0206559 | A1* | 8/2012 | Lin | H04L 12/1827 348/14.08 |
| 2012/0218373 | A1* | 8/2012 | N'guessan | H04N 7/15 348/14.08 |
| 2013/0019096 | A1 | 1/2013 | Palzer et al. | |
| 2014/0020003 | A1* | 1/2014 | Alshinnawi | H04N 21/236 725/12 |
| 2014/0114753 | A1* | 4/2014 | Xiao | G06Q 30/02 705/14.49 |
| 2014/0237079 | A1* | 8/2014 | Lockerbie | H04N 21/2146 709/218 |
| 2014/0237709 | A1 | 8/2014 | McCulloch et al. | |
| 2014/0303968 | A1 | 10/2014 | Ward et al. | |
| 2015/0156324 | A1* | 6/2015 | Assem | H04M 3/2227 370/260 |
| 2016/0315842 | A1 | 10/2016 | Boss et al. | |

OTHER PUBLICATIONS

Combined Search and Examination Report under Sections 17 and 18(3); Intellectual Property Office—United Kingdom; Application No. GB1606808.6; dated Jan. 2, 2016; 6 pages.

Made in IBM Labs: Enabling Dynamic Prioritization of Data in the Cloud; IBM News Release; Apr. 11, 2014; Retrieved from the Internet Oct. 13, 2014; URL: http://ww.03.ibm.com/press/us/en/pressrelease/43658.wss; 2 pages.

Wikipedia; Next-generation network; Retrieved from the Internet Oct. 13, 2014; URL: http://en.wikipeida.org/wiki/Next-generation_network; 5 pages.

Syta, James M.; List of IBM Patents or Patent Applications Treated as Related; May 1, 2018; 1 page.

* cited by examiner

DYNAMICALLY ADJUSTING QUALITY OF SERVICE USING COGNITIVE FOCUS OF ATTENTION DETECTION

CROSS REFERENCE TO RELATED APPLICATIONS

This application is a continuation application claiming priority to Ser. No. 14/696,916 filed Apr. 27, 2015, the contents of which are hereby incorporated by reference.

TECHNICAL FIELD

The present invention relates to managing a performance of a resource in a networked computing environment, and more particularly to adjusting a performance of an application while maintaining a perceived quality of service.

BACKGROUND

Quality of service (QoS) is the overall performance of a computer network or another computing environment and includes a prioritization of computing resources. The prioritization may cause certain packets (e.g., real time voice over Internet Protocol (VoIP) and streaming video) on a computer network to receive special, high-priority treatment, while other packets (e.g., e-mail) on the computer network are delivered in a low-priority manner. Packets delivered on the computer network can be tagged with different QoS metadata while potentially carrying any application's data, so that a variety of services are provided seamlessly over a single IP Next Generation Network. New network capabilities modify the QoS prioritization, such that hierarchical per-subscriber QoS differentiates by subscription tiers among users, thereby providing "per-user policing". In this way, metadata associated with user class provides higher priority to packets intended for higher paying customers. A combination of application-specific QoS prioritization and user-specific QoS prioritization (i.e., per-user policing) is known as "per-session policing," which allows a user to have different subscription tiers for different application services (e.g., VoIP vs. television), while each of the services is delivered over the same network. Per-session policing allows QoS prioritization to be parameterized by both the application service ("from") and user subscription ("to") metadata.

The known per-user and per-session policing techniques provide no way of distinguishing between varying needs of each user for bandwidth and packet priority. The deployment of limited resources of the computer network is inefficient because the varying bandwidth and packet priority needs of the user are not taken into account while ensuring a quality of service to the user based on a quality of service agreement for bandwidth and packet priority.

Known approaches for dynamically modifying Quality of Service (QoS) levels for resources running in a networked computing environment include identifying a set of service level requirements associated with a resource, mapping the set of service level requirements to a set of QoS parameters associated with a transport layer of the networked computing environment, determining a current performance of the resource within the transport layer, performing a comparison of the current performance to the set of service level requirements, and adjusting the set of QoS parameters based on the comparison indicating the current performance does not meet the set of service level requirements. Known approaches for managing a quality of service of an application adjust the QoS without ensuring the same market-determined QoS that the packet sender and packet receiver had previously agreed upon.

BRIEF SUMMARY

In a first embodiment, the present invention provides a method of managing a quality of service (QoS) of an application running in a networked computing environment. The method includes a computer generating a model of a cognitive focus of attention of a user. The model is based on information received from one or more hardware monitoring devices external to the computer or one or more software tools that monitor one or more respective states of the user. The one or more states of the user have a one-to-one correspondence to one or more software applications running on a computer network. The method further includes the computer determining one or more respective measurements of an actual QoS for the one or more software applications. The method further includes, based on the model of the cognitive focus of attention of the user, the computer determining one or more estimations of a perceived QoS for the one or more software applications. The perceived QoS is a level of quality of service being perceived by the user via the cognitive focus of attention. The method further includes the computer determining one or more respective current usages by the user of the one or more software applications. The method further includes, based on the generated model of the cognitive focus of attention of the user, the one or more measurements of the actual QoS for the one or more software applications, and the one or more current usages by the user of the one or more software applications, the computer determining an adjustment to the actual QoS of a software application included in the one or more software applications, while maintaining unchanged an estimation of a perceived QoS for the software application. The estimation of the perceived QoS is included in the one or more estimations.

A system and computer program product corresponding to the above-summarized method of the first embodiment are also described and claimed herein. Advantages of the above-summarized method include allowing a network service provider to derive more return on an investment in the computer network by charging senders and receivers more for better assured service, without violating a QoS expectation of a market of the network service provider.

In a first aspect of the first embodiment, the method may further include performing the adjustment to the actual QoS of the software application, which advantageously increases an efficiency of sending packets to the software application via the computer network.

In a second aspect of the first embodiment, the step of determining the adjustment to the actual QoS of the software application may include determining a decrease or an increase in a rate of sending packets to the software application via the computer network, which advantageously improves the overall experience of user with the network computing environment.

In a third aspect of the first embodiment of the present invention, the step of determining the adjustment to the actual QoS of the software application may include determining first and second sets of packets as packets being sent to the software application via the computer network to provide first and second portions, respectively, of a presentation that includes at least one of an audio component and a video component. The step of determining the adjustment further includes determining a decrease in a first rate of sending the first set of packets to the software application via the computer network. The step of determining the adjustment further includes determining a maintenance of a second rate of sending the second set of packets to the software application via the computer network so that the second rate is unchanged. The step of determining the adjustment further includes determining the adjustment to the actual QoS to include the decrease in the first rate and the maintenance of the second rate, which advantageously allows a network service provider to lower network costs while providing the same market-determined QoS to a packet sender and packet receiver.

In a fourth aspect of the first embodiment of the present invention, the method further includes the computer determining the user is not currently utilizing the software application or is utilizing the software application at a rate that is less than a predetermined threshold rate. The step of determining the adjustment includes determining a decrease in a rate of sending packets to the software application via the computer network, based on the user not currently utilizing the software application or utilizing the software application at a rate that is less than the threshold rate. Implementing the fourth aspect advantageously allows a network service provider to lower network costs while providing the same market-determined QoS to a packet sender and packet receiver.

In a fifth aspect of the first embodiment of the present invention, the method further includes the computer determining that the cognitive focus of attention indicates the user is not in view of video content of the software application but is in range of audio content of the software application. The step of determining the adjustment includes determining a decrease in a rate of the video content being sent to the software application via the computer network but maintaining unchanged a rate of the audio content being sent to the software application via the computer network. Implementing the fifth aspect advantageously allows a network service provider to lower network costs while providing the same market-determined QoS to a packet sender and packet receiver.

In a second embodiment, the present invention provides a method of managing a QoS of a video conferencing application. The method includes a computer determining a user is communicating with a first participant and not with one or more other participants, where the user, first participant, and one or more other participants are participants in a video conference provided by the video conferencing application via a computer network. The method further includes, based on the user communicating with the first participant, the computer generating a model of a cognitive focus of attention of a user. The cognitive focus of attention is a region of a display presenting the video conference, where the region includes a face of the first participant. The method further includes the computer determining a first actual QoS for other regions of the display that do not include the region that includes the face of the first participant. The method further includes the computer determining a second actual QoS for the region that includes the face of the first participant. The method further includes, based on the model of the cognitive focus of attention of the user, the computer determining an estimation of a perceived QoS for the video conferencing application. The perceived QoS is a level of quality of service that is perceived by the user via the cognitive focus of attention. The method further includes, based on the generated model of the cognitive focus of attention of the user, the first actual QoS for the other regions, and the second actual QoS, the computer determining an adjustment to the first actual QoS, without adjusting the second actual QoS, and while maintaining unchanged the estimation of the perceived QoS.

Advantages of the above-summarized method of the second embodiment include allowing a network service provider to derive more return on an investment in the computer network by charging participants in a video conference more for better assured service, without violating the participants' expectation of QoS.

In a first aspect of the second embodiment, the method further includes the computer determining a resolution of peripheral vision of the user. The step of determining the adjustment includes determining a delay or a dropping of a set of packets that specify the other regions so that a resolution of the other regions matches the resolution of the peripheral vision of the user, which advantageously allows a network service provider to lower network costs while maintaining unchanged the QoS of the video conference which is expected by the video conference participants.

In a second aspect of the second embodiment, the method further includes performing the adjustment which advantageously decreases a cost of sending the set of packets to the video conferencing application.

In a third aspect of the second embodiment, the method further includes the computer receiving data that (1) recognizes speech of the user or first participant or (2) tracks eye movements of the user. The step of determining the user is communicating with the first participant and not with the one or more other participants is based on the received data that recognizes the speech or tracks the eye movements of the user, which advantageously allows a network service provider to lower network costs while maintaining unchanged the QoS expected by the video conference participants.

In a third embodiment, the present invention provides a method of managing a QoS of a video streaming application running in a networked computing environment. The method includes a computer generating a model of a cognitive focus of attention of a user. The model includes a specification of a foveated region of a display of content of the video streaming application. The foveated region corresponds to a visual fovea of the user. The specification of the foveated region is based at least in part on measurements of eye movements of the user, where the measurements are received from a monitoring device which is external to the computer. The method further includes, based on the generated model including the specification of the foveated region, the computer determining an adjustment to an actual QoS of packets sent to present the display of the content of the video streaming application. The adjustment includes a delay or a dropping of a first set of packets that specify a portion of the display outside the foveated region and a maintenance of a rate of sending a second set of packets that specify the foveated region.

Advantages of the above-summarized method of the third embodiment include allowing a network service provider to derive more return on an investment in the computer network by charging users of a video streaming application more for better assured service, without violating the users' expectation of QoS.

In a first aspect of the third embodiment, the method further includes the computer determining a resolution of peripheral vision of the user. The step of determining the adjustment includes determining the delay or the dropping of the first set of packets so that a resolution of the portion of the display outside the foveated region matches the resolution of the peripheral vision of the user, which advantageously allows a network service provider to lower network costs while maintaining unchanged the QoS associated with the display of the video streaming application, where the QoS is expected by the video conference participants.

In a second aspect of the third embodiment, the method further includes performing the adjustment which advantageously decreases a cost of sending the first set of packets to the video streaming application.

In a third aspect of the third embodiment, the step of determining the adjustment includes determining a decrease in an actual QoS of the first set of packets while maintaining unchanged a perceived QoS for the video streaming application, which advantageously allows a network service provider to lower network costs while maintaining unchanged the QoS associated with the display of the video streaming application, where the QoS is expected by the video conference participants.

DETAILED DESCRIPTION

Overview

Embodiments of the present invention dynamically adjust a QoS of software application(s) in a networked computing environment using techniques that determine a state of a user in relation to each software application. The state of the user may be determined by analyzing data from monitoring device(s) or application plugins that measure and/or detect a cognitive state, a focus of attention, and/or behavior(s) of the user. Estimation(s) of the perceived quality of service (pQoS) for the respective software application(s) are determined based on a transformation of the analyzed data from the monitoring device(s). A perceived quality of service (pQoS) is defined as a rated QoS by single packet receiver, which may or may not differ from the actual QoS. The pQoS refers not to fixed service, but instead to perceived value. The pQoS is compared to the sender's market criteria (e.g., average customer satisfaction) and requires that a receiver's expected perception of quality is exposed by the technology and measured or estimated. In this way, pQoS approximates the market QoS (i.e., the market for QoS that a packet sender and a receiver have agreed upon) even as the actual QoS decreases.

A system disclosed herein communicates pQoS to the computer network, such that packet prioritization that indicates actual QoS is adjusted, while maintaining the same pQoS for the software application(s). By maintaining the same pQoS, the level of quality that is demanded by a market for QoS that a packet sender and receiver have agreed upon is also maintained. By maintaining the quality demanded by the market, network providers derive more return on their network investment by allowing the network providers to charge senders and receivers more for better assured service, without violating their market's expectation for QoS. Furthermore, embodiments disclosed herein allow network providers to decrease or minimize actual QoS associated with packet prioritization, while maintaining the same market-determined quality to packet senders and receivers, thereby allowing the network providers to derive more return on investment by lowering network costs.

Although the embodiments discussed below include actual QoS adjustment based on application and network linkage, the method and system disclosed herein may be extended to modify virtual central processing units, virtual memory, or any other computer resource that may affect pQoS or actual QoS. For instance, the actual capacity of a cloud service may be reduced when the cloud service is not being used.

System for Managing QoS Based on the State of a User

Figure 1:
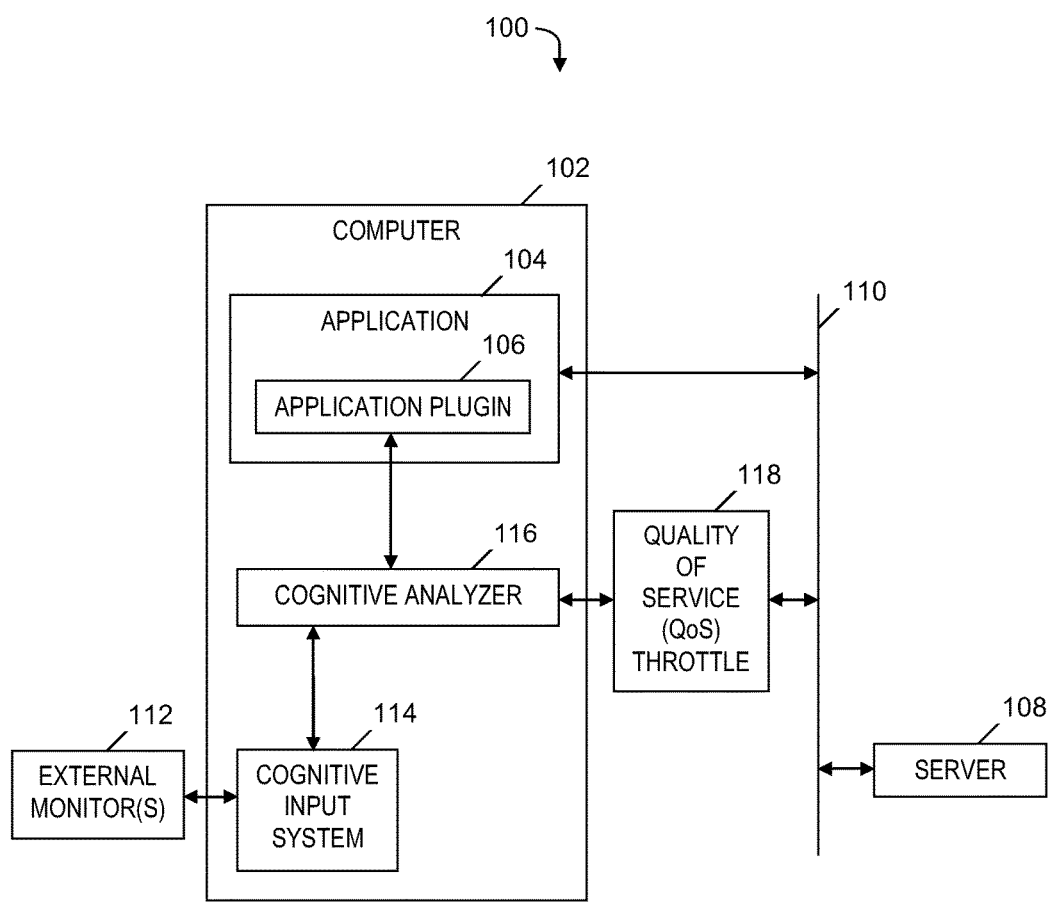
FIG. 1 is a block diagram of a system for managing a quality of service of an application running in a networked computing environment, in accordance with embodiments of the present invention.

FIG. 1 is a block diagram of a system 100 for managing a quality of service of an application running in a networked computing environment, in accordance with embodiments of the present invention. System 100 includes a computer 102, which executes a software application 104, which includes an application plugin 106 that monitors input from a user of computer 102, where the input indicates a cognitive state, focus of attention, and/or behavior of the user. For example, application plugin 106 may be a plugin to an operating system that monitors the mouse clicks made by a user. As another example, application plugin 106 may be a plugin to a browser that monitors the current activity of the browser to determine pQoS in real time.

Application 104 receives and presents content sent by a computer server 108 via a computer network pipe 110. Each of external monitor(s) 112 is a hardware device that monitors or senses the state of the user in relation to a respective software application, including application 104. Other software application(s) corresponding to the state of the user are executed by computer 102 or by other computer(s) (not shown). Although not shown in FIG. 1, external monitor(s) 112 may include a monitoring device that is worn by the user. The monitored state of the user includes measurements and other indicators of the user's cognitive state, focus of attention, and/or behavior in relation to application 104. External monitor(s) 112 may include, for example, a video camera, motion detector, or a monitor of Wi-Fi strength. For instance, external monitor 112 tracks the eye movements and gaze of the user to determine the user's focus of attention on content presented in a display by application 104.

A software-based cognitive input system 114 being executed by computer 102 (see FIG. 1) or by another computer (not shown) receives and collates information sent from external monitor 112. Other external monitor(s) (not shown) which are different from external monitor 112 may be included in system 100 and communicate information to cognitive input system 114 about the state of the user in relation to application 104 and/or to another software application.

A software-based cognitive analyzer 116 is executed by computer 102 or by another computer (not shown) and receives information sent from cognitive input system 114, where the information had been received from external monitor 112 (i.e., the measurements and other indicators of the user's cognitive state, focus of attention, and/or behavior in relation to application 104). Based on the information received from cognitive input system 114, cognitive analyzer 116 determines how the actual QoS can be changed while retaining the same pQoS. Cognitive analyzer 116 assesses the received information based on the amount of actual bandwidth currently being used by the user while the user is in a particular cognitive state, has a particular focus of attention, or is engaging in a particular behavior. Based on its assessment of the received information, cognitive analyzer 116 determines an adjustment to the actual QoS of application 104 and makes a request for the adjustment by sending a request to a software-based quality of service (QoS) throttle 118. QoS throttle 118 is being executed by computer 102 or by another computer (not shown). In one embodiment, QoS throttle 118 is executed on a computer managed by a network service provider that provides services of server 108 to application 104 via network pipe 110.

Although not shown in FIG. 1, other variations of system 100 may include application plugin 106, but not external monitor 112. Still other variations of system 100 may include external monitor 112, but not application plugin 106.

The functionality of the components of FIG. 1 is described in more detail in the discussions presented below relative to FIG. 2 and FIG. 5.

Process for Managing QoS Based on the State of a User

Figure 2:
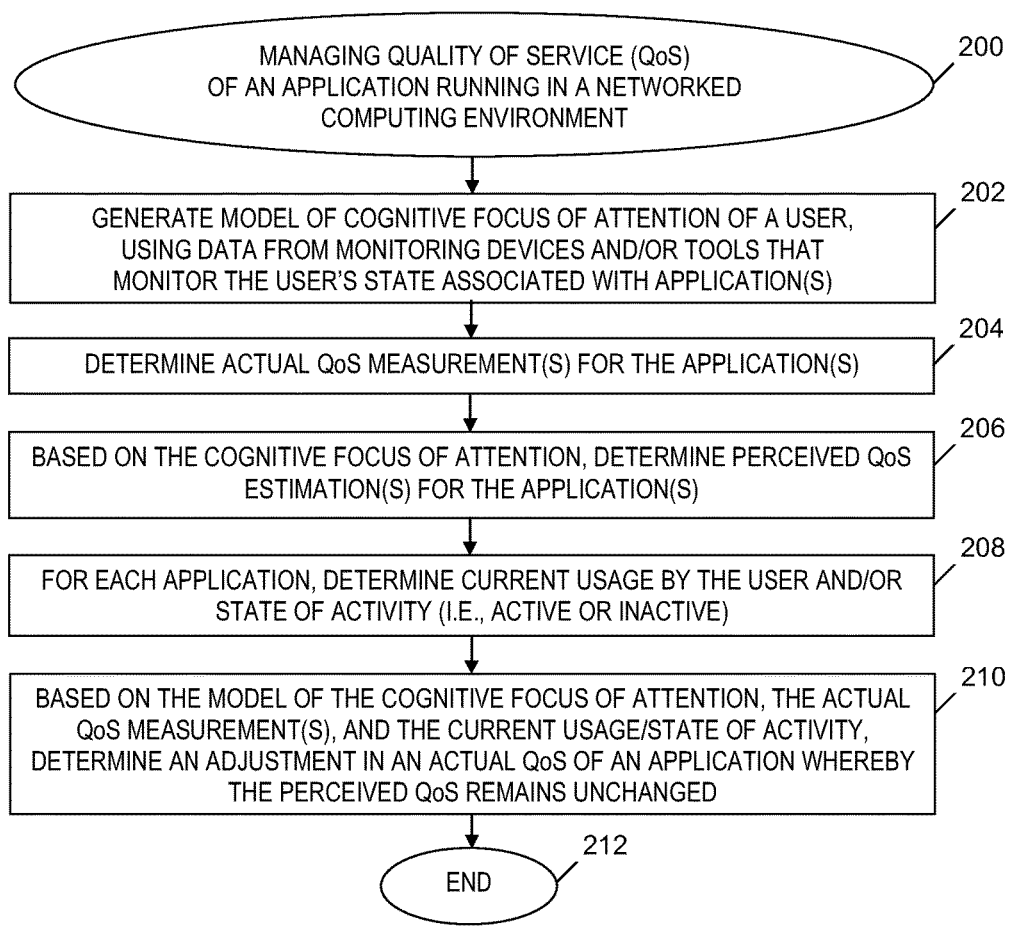
FIG. 2 is a flowchart of a process of managing a quality of service of an application running in a networked computing environment, where the process is implemented in the system of FIG. 1, in accordance with embodiments of the present invention.

FIG. 2 is a flowchart of a process of managing a quality of service of an application running in a networked computing environment, where the process is implemented in the system of FIG. 1, in accordance with embodiments of the present invention. The process of FIG. 2 begins at step 200. Prior to step 202, external monitor 112 (see FIG. 1) collects data about the user by detecting and/or measuring indicators of the state of the user in relation to application 104 (see FIG. 1). In one embodiment, the collected data about the user includes a combination of the direction of gaze, arousal level, point in a circadian cycle, workload, and emotional state. In other embodiments, the collected data may include other indicators of the state of the user. The data may be collected by a cognitive interface provided by a remote cognitive computing cloud based service, which allows a user to experience an interface in a manner that is adaptive to the user's cognitive needs (e.g., the volume on a television lowers when a telephone rings, information is organized more simply on a web application during early morning hours, etc.).

External monitor 112 (see FIG. 1) sends the collected data to cognitive input system 114, which subsequently sends the data to cognitive analyzer 116 (see FIG. 1). In one embodiment, external monitor 112 (see FIG. 1) detects and/or measures a combination of the following attributes of the user: a location or motion of the entire user (including whether the user is in a particular room or has moved to a particular room), eye movements, a direction of the attention or gaze of the user, skin conductance, heart rate, and respiratory rate. External monitor 112 (see FIG. 1) may also provide pedometry and/or accelerometry measurements about the user. Also prior to step 202, application plugin 106 (see FIG. 1) detects the state of the user by monitoring the user's activity with application 104 (see FIG. 1), such as window focus, mouse movements, clicks, or browser activity.

In step 202, based on the data collected about the user by external monitor 112 (see FIG. 1) and/or application plugin 106 (see FIG. 1), cognitive analyzer 116 (see FIG. 1) generates in real time a model of the cognitive focus of attention of the user in relation to specific modalities of information (e.g., visual information and audio information) provided by packets being received by application 104 (see FIG. 1). The model generated in step 202 includes a model of the user's access to information provided by application 104 (see FIG. 1), such as audio and video information. In one embodiment, the model includes a specification of the user's sensory apparatus including a model of the user's visual sensory apparatus and the user's auditory sensory apparatus. The model of the user's visual sensory apparatus includes a constraint that the user must be in a location that allows immediate access to a presentation of visual information provided by application 104 (see FIG. 1) (e.g., the user must be in the same room as an audiovisual device that includes a display that includes the visual information provided by application 104 (see FIG. 1)). The model of the user's auditory sensory apparatus does not include the aforementioned constraint on the user's location relative to the visual information, but instead includes another constraint that the user must be in a predetermined audible range of the audio information provided by application 104 (see FIG. 1) (e.g., the user must be in audible range of the audio information provided by application 104 via the audiovisual device, with no requirement that the user be in the room that includes the audiovisual device).

In one embodiment, step 202 includes generating other model(s) of the cognitive focus of attention of the user in relation to information provided by other software application(s) that are not shown in FIG. 1.

Cognitive analyzer 116 (see FIG. 1) represents the model(s) of the cognitive focus of attention in a data structure and stores the data structure in a data repository (not shown in FIG. 1).

In step 204, cognitive analyzer 116 (see FIG. 1) determines an actual QoS measurement for application 104 (see FIG. 1). For example, application 104 (see FIG. 1) is a video streaming application and cognitive analyzer 116 (see FIG. 1) determines the actual QoS is 10 megabits per second (Mb/sec). In one embodiment, step 204 includes cognitive analyzer 116 (see FIG. 1) determining actual QoS measurement(s) for one or more other software applications that are not shown in FIG. 1 (e.g., determining the actual QoS measurement of a browser available to the user is 1 Mb/sec).

In step 206, based on the model of the cognitive focus of attention generated in step 202, cognitive analyzer 116 (see FIG. 1) determines an estimation of pQoS for application 104 (see FIG. 1) in real time. For example, application 104 (see FIG. 1) is a video streaming application and cognitive analyzer 116 (see FIG. 1) determines an estimation of the pQoS for the video streaming application is 10 Mb/sec. Cognitive analyzer 116 (see FIG. 1) assigns a pQoS value to packets intended for consumption in real time by the user's cognitive process (e.g., video, audio communication, interactive games, streaming data, etc.), so that the pQoS value is directly proportional to the probability that the packets will actually be received and change the user's cognitive process, based on the model generated in step 202. Cognitive analyzer 116 (see FIG. 1) estimates the aforementioned probability by representing applications and the packets the applications are receiving in a time slice, and determining which packets are actually received by the user's cognitive process. Using physiological measures of the user's reactions to missing but needed data (e.g., changes in eye movements, facial expressions, electroencephalogram (EEG) data, etc.), cognitive analyzer 116 (see FIG. 1) analyzes the packets in the time slice as a scene. Cognitive analyzer 116 (see FIG. 1) identifies those packets that have the greatest physiological response when delayed or dropped.

The identified packets demarcate a "cognitive fovea" estimate (i.e., estimate of the cognitive focus of attention), which will move through the time slices, similar to how the user's actual visual fovea moves through a visual scene each time the user's eye moves. Cognitive analyzer 116 (see FIG. 1) predicts movements of the cognitive fovea by modeling the movements as a Markov Decision Process, subject to the constraints of other measures, such as eye position, current open applications, and ambient measures of the environment. Cognitive analyzer 116 (see FIG. 1) parameterizes the predictive model of the movements of the cognitive fovea and identifies which packets are inside the cognitive fovea and which packets are outside the cognitive fovea. Cognitive analyzer 116 (see FIG. 1) determines that the actual QoS of the packets identified as being outside the cognitive fovea may be decreased in the adjustment determined in step 210, as discussed below.

In step 208, based on the model generated in step 202 and organized by each application including application 104 (see FIG. 1), cognitive analyzer 116 (see FIG. 1) determines the user's current usage of each application and/or the state of the usage of each application (i.e., active or inactive). An active state means the user is currently using the application and an inactive state means the window that includes the application does not have focus. The active or inactive state is determined by data in the model generated in step 202 which indicates browser window focus, clicks, mouse movements or other similar input by the user.

As one example the current usage of application 104 (see FIG. 1), consider that application 104 is a telephone VoIP application and cognitive analyzer 116 (see FIG. 1) determines that the user is utilizing the application at a level of 200,000 bits per second, or 20% of the actual and perceived QoS of 1 Mb/sec.

In step 210, based on the model generated in step 202, the actual QoS measurement(s) determined in step 204, and the current usage(s) and active or inactive state(s) determined in step 208, cognitive analyzer 116 (see FIG. 1) determines an adjustment of the actual QoS of application 104 (see FIG. 1) whereby the estimated pQoS determined in step 206 remains unchanged (i.e., the corresponding pQoS is maintained). In one embodiment, the adjustment determined in step 210 is a modification of packet priority for content delivered to application 104 (see FIG. 1) or a specified portion of the content delivered to application 104 (see FIG. 1). For example, the adjustment determined in step 210 is a reduction of the actual QoS of a video streaming application from 10 Mb/sec to 1 Mb/sec.

In one embodiment, the adjustment determined in step 210 is an increase or a decrease in a rate of sending packets to application 104 (see FIG. 1) from server 108 (see FIG. 1) via network pipe 110 (see FIG. 1).

In one embodiment, step 210 includes cognitive analyzer 116 (see FIG. 1) determining first and second sets of packets as packets being sent to application 104 (see FIG. 1) via network pipe 110 (see FIG. 1) to provide first and second portions, respectively, of a presentation that includes an audio component, a video component, or both audio and video components. Further, cognitive analyzer 116 (see FIG. 1) determines a decrease in a first rate of sending the first set of packets to application 104 (see FIG. 1) via network pipe 110 (see FIG. 1) and determines that a second rate of sending the second set of packets to application 104 (see FIG. 1) via network pipe 110 (see FIG. 1) is maintained unchanged. Still further, cognitive analyzer 116 (see FIG. 1) determines the adjustment to the actual QoS to include the decrease in the first rate and the maintenance of the second rate as being unchanged.

In one embodiment, cognitive analyzer 116 (see FIG. 1) determines the user is not currently utilizing application 104 (see FIG. 1) or is utilizing application 104 (see FIG. 1) at a rate that is less than a predetermined threshold rate, and in response, determining the adjustment in step 210 includes determining a decrease in a rate of sending packets to application 104 (see FIG. 1) via network pipe 110 (see FIG. 1).

In one embodiment, cognitive analyzer 116 (see FIG. 1) determines a visual range of the user, determines an audio range of the user, and determines that the user's cognitive focus of attention indicates the user is located in a position and an environment so that (1) the video content being provided by application 104 (see FIG. 1) is not in the visual range of the user and (2) the audio content being provided by application 104 (see FIG. 1) is within the audio range of the user. Determining the adjustment in step 210 includes determining a decrease in a rate of sending the video content to application 104 (see FIG. 1) via network pipe 110 (see FIG. 1) and maintaining as unchanged a rate of sending the audio content to application 104 (see FIG. 1) via network pipe 110 (see FIG. 1).

In response to completing step 210, cognitive analyzer 116 (see FIG. 1) sends a request to QoS throttle 118 (see FIG. 1) to make the adjustment determined step 210, and in response to receiving the request, QoS throttle 118 (see FIG. 1) makes the adjustment determined in step 210. In one embodiment, QoS throttle 118 (see FIG. 1) is managed by a network service provider (e.g., Internet service provider, cellular provider, wireless link, etc.). The network service provider makes the adjustment to the actual QoS. In one embodiment, the adjustment to the actual QoS minimizes the actual QoS for each application data packet sent to application 104 (see FIG. 1), while maintaining unchanged the pQoS relative to application 104 (see FIG. 1).

In comparison to application data packet delivery before the adjustment is made, the network service provider delivers the application data packets after the adjustment more efficiently and at a lower cost from server 108 (see FIG. 1) to application 104 (see FIG. 1) via network pipe 110 (see FIG. 1). The process of FIG. 2 ends at step 212.

As one example of the process of FIG. 2, cognitive analyzer 116 (see FIG. 1) generates the model in step 202, which includes a set of monitors linked to applications and the current state of the user's activity for each application, as shown in Table 1.

TABLE 1

| Monitor | Application | State |
| --- | --- | --- |
| Motion detector | All applications | Away/Not Away/In audio range |
| Wi-Fi | All Wi-Fi enabled applications | Percent of bandwidth used by application |
| Browser Plugin | Browser | Active/Inactive |

The browser may detect, for all applications that use the browser, whether the state of the user's activity with each application is active (i.e., the user is currently using the application) or inactive (i.e., the user is not currently focused on the browser). Determining the state of the user's activity may utilize window focus, clicks, mouse movement, or other similar input.

Cognitive analyzer 116 (see FIG. 1) utilizes the available states and modifications of an application or service; e.g., a video stream may be able to raise and lower both video and audio bandwidth. A VoIP application may be able to reduce or increase quality. Table 2 includes an example of applications and available modifications, which may be included in the model generated in step 202.

TABLE 2

| Application | Available modifications |
|---|---|
| Browser | Increase or decrease bandwidth used |
| Video Streamer | Frame rate up/down/off |
|  | Audio rate up/down/off |
| Telephone VoIP | Increase or decrease audio rate |
|  | Increase or decrease latency |

In this example, cognitive analyzer 116 (see FIG. 1) next retains state information by determining the actual QoS for each application in step 204, as shown in Table 3. The pQoS determined in step 206 is also shown in Table 3.

TABLE 3

| Application | Current actual QoS and modification | State | Perceived QoS |
|---|---|---|---|
| Browser | 1 Mb/sec – Keep Same | Active | 1 Mb/sec |
| Video Streamer | 10 Mb/sec – Decrease | Inactive | 10 Mb/sec |
| Telephone VoIP | 1 Mb/sec – Decrease | Using 200 k/sec (20%) | 1 Mb/sec |

Cognitive analyzer 116 (see FIG. 1) measures each application to determine the current usage in step 208, based on monitoring devices and plugins (i.e., external monitor(s) 112 (see FIG. 1) and application plugin 106 (see FIG. 1)) and based on the currently assigned actual QoS, as shown in Table 3.

Based on the information in Table 3, cognitive analyzer 116 (see FIG. 1) determines if an adjustment is needed by determining whether the state indicates a need for an adjustment and comparing the pQoS and actual QoS. If the state is inactive or if the state indicates a usage less than a predetermined threshold of the QoS, then cognitive analyzer 116 (see FIG. 1) determines that an adjustment is needed. If an adjustment is needed, cognitive analyzer determines the type and amount of the adjustment in step 210 and subsequently QoS throttle 118 (see FIG. 1) makes the adjustment.

In Table 3, because the user is inactive with respect to the video streamer and because the current actual QoS and pQoS are the same (i.e., 10 Mb/sec), cognitive analyzer 116 (see FIG. 1) determines that an adjustment is needed (i.e., the adjustment decreases the 10 Mb/sec rate for the actual QoS for the video streamer application). In Table 3, because (1) the user is using the telephone VoIP application at a rate of 200 k/sec, which is 20% of the QoS of 1 Mb/sec, (2) the 20% is below a predetermined percentage, and (3) the current actual QoS and pQoS are the same (i.e., 1 Mb/sec), cognitive analyzer 116 (see FIG. 1) determines that an adjustment is needed (i.e., the adjustment decreases the 1 Mb/sec rate for the actual QoS for the telephone VoIP application).

Figure 3:
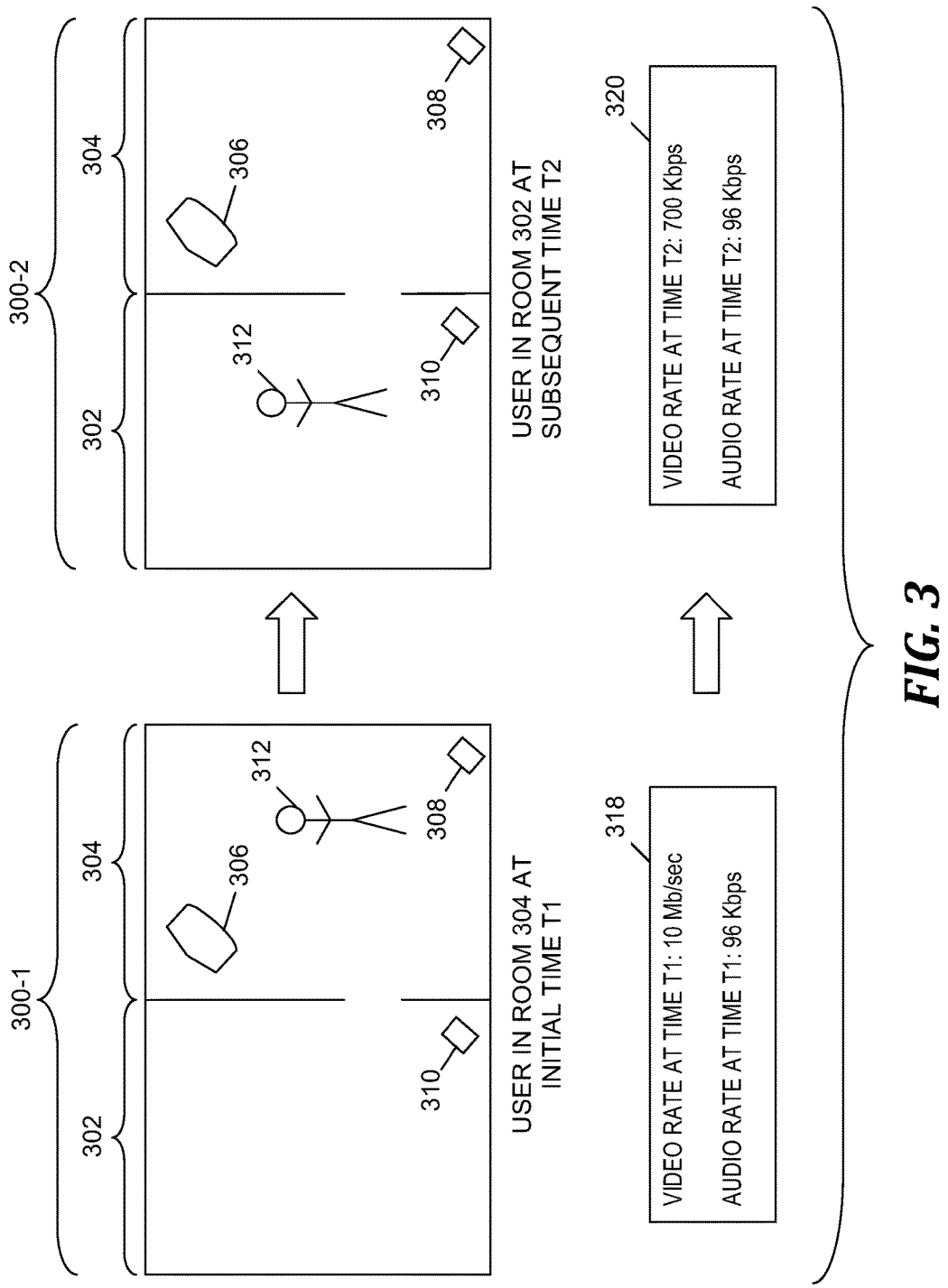
FIG. 3 is an example of managing the quality of service of a video streaming application in the process of FIG. 2, in accordance with embodiments of the present invention.

FIG. 3 is an example of managing the quality of service of a video streaming application in the process of FIG. 2, in accordance with embodiments of the present invention. A first configuration 300-1 at time T1 includes adjacent rooms 302 and 304. At time T1, room 304 includes a television 306 that includes a display and speakers that present video and audio, respectively, of a high definition video provided by a video streaming application, which receives the high definition video from server 108 (see FIG. 1) via the Internet. The high definition video is an audiovisual presentation that simultaneously presents a video portion and an audio portion. In this example, application 104 (see FIG. 1) is the aforementioned video streaming application. At time T1, room 304 includes a motion detector device 308 and room 302 includes a motion detector device 310. In this example external monitor(s) 112 (see FIG. 1) include motion detector devices 308 and 310.

At time T1, room 304 includes a user 312, who expects high bandwidth from her Internet provider. While user 312 is watching the high definition video on television 306 at time T1, she needs the actual bandwidth (i.e., actual QoS) for the video streaming application to match her perceived bandwidth (i.e., pQoS); otherwise, she would not be able to watch the high definition video.

Between time T1 and time T2, which is subsequent to time T1, user 312 moves from room 304 to room 302. A second configuration 300-2 at time T2 includes adjacent rooms 302 and 304, where user 312 is in room 302. Motion detector 308 detected between time T1 and time T2 that user 312 moved from room 304 to room 302. At time T2, motion detector 310 detects that user 312 is in room 302. After user 312 moves from room 304 to room 302, she still wants her pQoS to remain the same as it was when she was in room 304 (i.e., her perception of the high definition video presentation while she is in room 302 indicates that her previous experience of seeing and hearing the high definition video presentation is ready to resume if she moves back into room 304). Using the information from motion detectors 308 and 310, cognitive analyzer 116 (see FIG. 1) retrieves information from a data structure in a data repository (not shown in FIG. 1), where the data structure is a representation of the model generated in step 202 (see FIG. 2). The retrieved information indicates (1) if user 312 is in room 304, she can see the video portion and hear the audio portion of the of the high definition video presented by the video streaming application, and (2) if user 312 is in room 302, she cannot see the video portion, but can hear the audio portion of the high definition video. Based on the retrieved information and in response to user 312 being in room 302, cognitive analyzer 116 (see FIG. 1) determines in step 210 (see FIG. 2) a reduction of the video bit rate of the video portion (i.e., reduction of the actual QoS of the video portion) of the high definition video, while retaining the audio bit rate of the audio portion (i.e., the actual QoS of the audio portion remains the same). Using the determination made by cognitive analyzer 116 (see FIG. 1), QoS throttle 118 (see FIG. 1) reduces the video bit rate from 10 Mb/sec to 700 kilobits per second (Kbps) and maintains the audio bit rate as unchanged at 96 Kbps, as indicated in a first summary 318 of the video and audio bit rates at time T1 and a second summary 320 of the video and audio bit rates at time T2.

By maintaining the audio bit rate unchanged from time T1 to time T2, user 312 still hears the audio portion after moving from room 304 to 302, thereby maintaining the pQoS while causing a more efficient usage of network pipe 110 because of the reduced video bit rate of the video portion.

Rather than reducing the video bit rate, a variation of the example in FIG. 3 includes cognitive analyzer 116 (see FIG. 1) determining a stoppage of the video portion of the presentation in response to user 312 being in room 302.

Other variations of the example in FIG. 3 include cognitive analyzer 116 (see FIG. 1) determining a reduction in the actual QoS by reducing the audio and video bit rate of the video streaming application in response to application plugin 106 (see FIG. 1) or external monitor 112 (see FIG. 1) detecting that user 312 pauses the presentation of high definition video, uses an application other than the video streaming application, or shrinks the display window being used by the video streaming application.

Figure 4A:
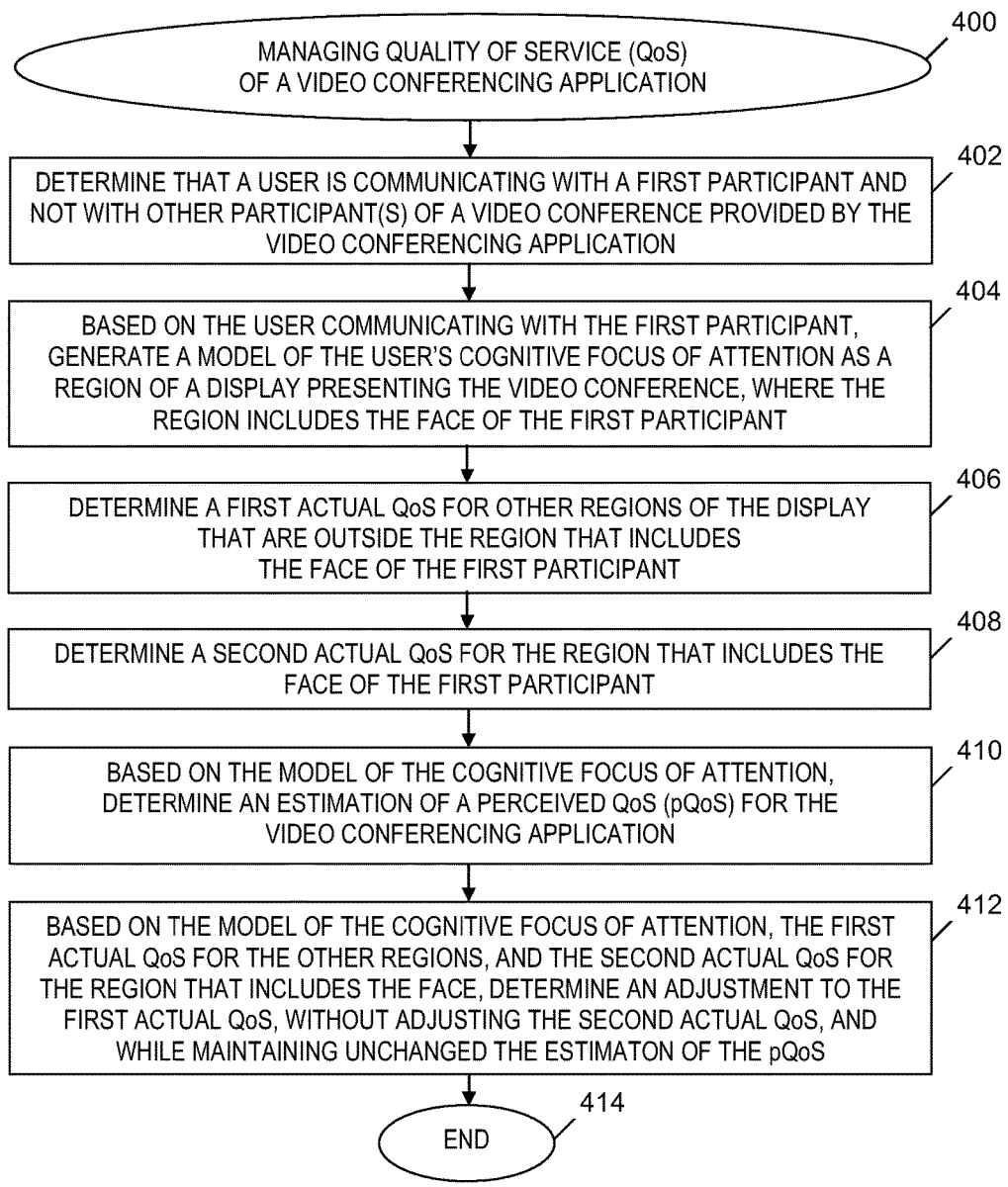
FIG. 4A is a flowchart of a process of managing a quality of service of a video conferencing application, where the process is implemented in the system of FIG. 1, in accordance with embodiments of the present invention.

FIG. 4A is a flowchart of a process of managing a quality of service of a video conferencing application, where the process is implemented in the system of FIG. 1, in accordance with embodiments of the present invention. The process of FIG. 4A begins at step 400. In step 402, cognitive analyzer 116 (see FIG. 1) determines that (1) a user is communicating with a first participant within a video conference provided by the video conferencing application and (2) the user is not communicating with other participant(s) of the video conference. In this embodiment, application 104 (see FIG. 1) is the video conferencing application.

In one embodiment, prior to step 402, cognitive analyzer 116 (see FIG. 1) receives data from (1) a speech recognition tool that recognizes speech of the user or the first participant during the video conference (e.g., the user's speech includes directly addressing the first participant by the name of the first participant), or (2) a monitoring device that tracks eye movements of the user (e.g., the user's gaze is directed to the first participant). Cognitive analyzer 116 (see FIG. 1) makes the determination that the user is communicating with the first participant and is not communicating with the other participant(s) based on the data received from the speech recognition tool or the eye movement monitoring device.

In step 404, based on the user communicating with the first participant, cognitive analyzer 116 (see FIG. 1) generates a model of the user's cognitive focus of attention as a region of a display presenting the video conference, where the region includes the face of the first participant with whom the user is communicating. In one embodiment, the model generated in step 404 includes a model of the user's access to audio and visual information provided by the video conferencing application. In one embodiment, the model includes a specification of the user's visual sensory apparatus including a specification of the resolution of the peripheral vision of the user and a specification of the resolution of the foveal vision of the user.

Cognitive analyzer 116 (see FIG. 1) represents the model generated in step 404 in a data structure and stores the data structure in a data repository (not shown in FIG. 1).

In step 406, cognitive analyzer 116 (see FIG. 1) determines a first actual QoS for other regions of the display that are outside the region that includes the face of the first participant.

In step 408, cognitive analyzer 116 (see FIG. 1) determines a second actual QoS for the region that includes the face of the first participant.

In step 410, based on the model of the cognitive focus of attention generated in step 404, cognitive analyzer 116 (see FIG. 1) determines an estimation of a pQoS for the video conferencing application.

In step 412, based on the model generated in step 404, the first actual QoS determined in step 406, and the second actual QoS determined in step 408, cognitive analyzer 116 (see FIG. 1) determines an adjustment to the first actual QoS, without adjusting the second actual QoS, and while maintaining unchanged the estimation of the pQoS determined in step 410. The adjustment to the first actual QoS includes a delay or a dropping of packets that specify the other regions of the display that are outside the region that includes the face of the first participant so that a resolution of the other regions of the display matches the resolution of the peripheral vision of the user.

After step 412, QoS throttle 118 (see FIG. 1) performs the adjustment determined in step 412, which decreases a cost of sending packets from server 108 (see FIG. 1) to the video conferencing application via network pipe 110 (see FIG. 1). The process of FIG. 4A ends in step 414.

Figure 4B:
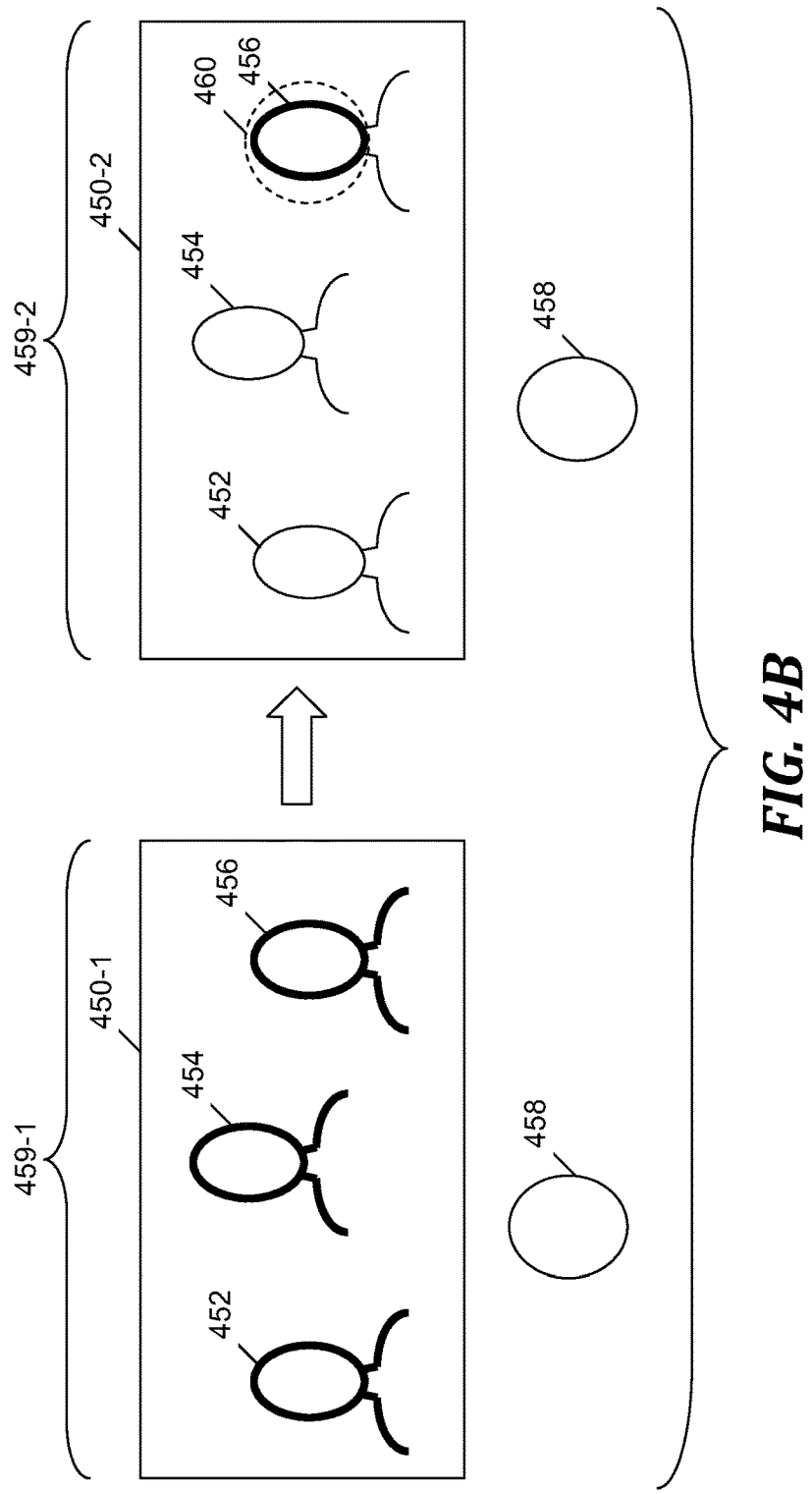
FIG. 4B is an example of managing the quality of service of a video conferencing application in the process of FIG. 4A, in accordance with embodiments of the present invention.

FIG. 4B is an example of managing the quality of service of a video conferencing application in the process of FIG. 4A, in accordance with embodiments of the present invention. A first display 450-1 of a multi-user video conference at time T1 presented by the video conferencing application includes three participants 452, 454 and 456 of the video conference. A user 458 is another participant in the video conference and is using the video conferencing application to view the first display 450-1. A first configuration 459-1 of the video conference at time T1 includes first display 450-1 and user 458. At time T1, the video conferencing application provides all portions of the first display 450-1 at a bit rate of 384 Kbps. At time T1, user 458 is not communicating with any of participants 452, 454 or 456.

At another time T2, which is subsequent to time T1, a second display 450-2 of the video conference again includes participants 452, 454, and 456. A second configuration 459-2 of the video conference at time T2 includes second display 450-2 and user 458. At time T2, application plugin 106 (see FIG. 1) or external monitor 112 (see FIG. 1) detects in step 402 (see FIG. 4A) that user 458 is communicating with participant 456 and not with participants 452 or 454 by (1) speech recognition of participant 456 and/or user 458 or (2) tracking eye movements of user 458. Based on user 458 communicating with participant 456 in the video conference and not communicating with participants 452 or 454, cognitive analyzer 116 (see FIG. 1) predicts that the cognitive focus of attention of user 458 is a region 460 that includes the face of participant 456. A specification of region 460 is stored in the model generated in step 404 (see FIG. 4A). In steps 406 and 408 in FIG. 4A, cognitive analyzer 116 (see FIG. 1) determines the bit rate of 384 Kbps for packets displaying portions of display 450-2 that are not within region 460 and for other packets displaying region 460. In step 410 (see FIG. 4A), cognitive analyzer 116 (see FIG. 1) determines a pQoS of the user viewing region 460 in the user's foveal vision, and determines another pQoS of the user viewing portions of the display outside region 460 in the user's peripheral vision.

Based on the predicted cognitive focus of attention being region 460, cognitive analyzer 116 (see FIG. 1) determines in step 412 (see FIG. 4A) (1) a reduction of the bit rate from 384 Kbps to 128 Kbps for portions of display 450-2 that are not within region 460 and (2) a maintenance of the bit rate at 384 Kbps for region 460 (i.e., the bit rate of the portion of display 450-2 within region 460 is unchanged from the bit rate of the portion within region 460 at time T1). Using the determination made by cognitive analyzer 116 (see FIG. 1), QoS throttle 118 (see FIG. 1) reduces the bit rate from 384 Kbps to 128 Kbps for portions of display 450-2 that are not within region 460.

In addition to examples discussed above relative to FIG. 3 and FIG. 4B, another example includes the user switching attention between applications, where cognitive analyzer 116 (see FIG. 1) generates a Markov Decision Process model that anticipates that given a trigger (e.g., entering a search term for a video stream), certain packets in the results of the search have a higher probability of being in the cognitive focus of attention than other packets. Cognitive analyzer 116 (see FIG. 1) determines an increase actual QoS for those packets that have the higher probability of being in the cognitive focus of attention.

As yet another example, managing an emergency event is facilitated by cognitive analyzer 116 (see FIG. 1) identifying data streams that are most relevant to the emergency event and predicts that the user's cognitive focus of attention will be on the data streams most relevant to the emergency event. Based on the predicted cognitive focus of attention, cognitive analyzer 116 (see FIG. 1) determines an increase in actual QoS for the identified data streams.

Figure 5:
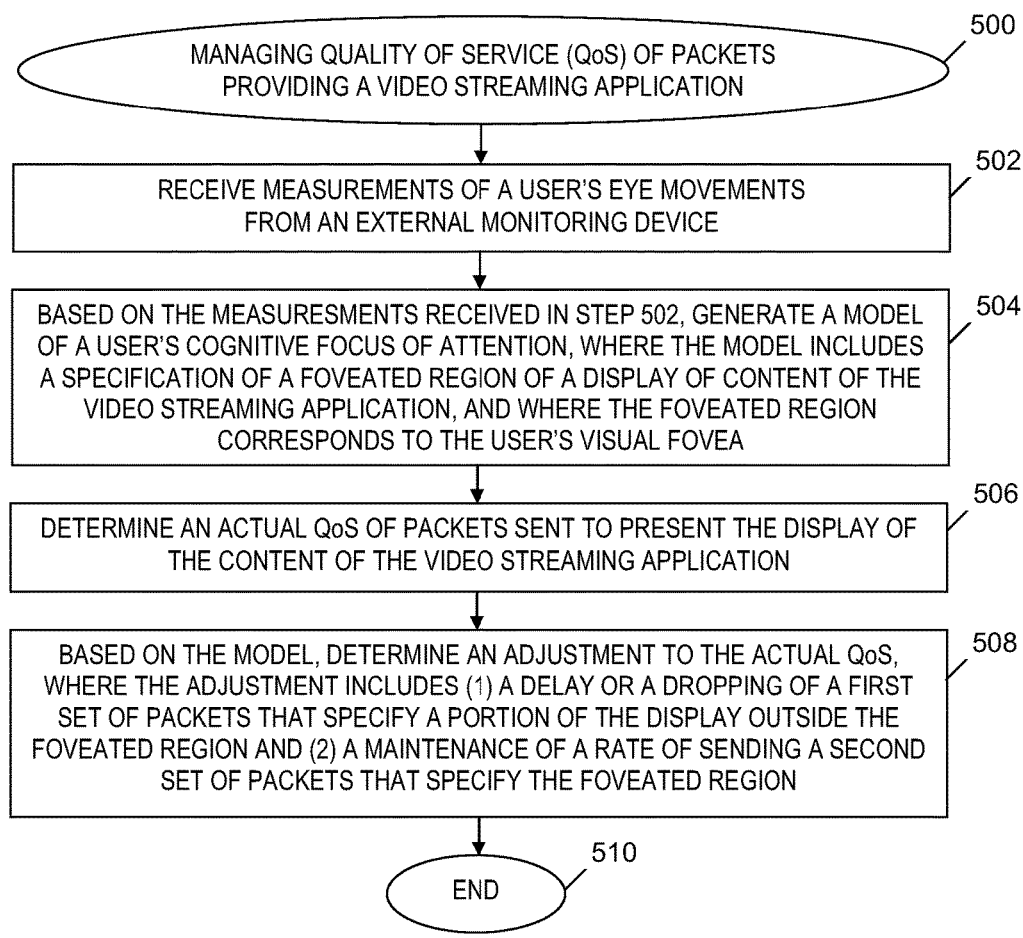
FIG. 5 is a flowchart of a process of managing the quality of service of a video streaming application, where the process is implemented in the system of FIG. 1, in accordance with embodiments of the present invention.

FIG. 5 is a flowchart of a process of managing the quality of service of a video streaming application, where the process is implemented in the system of FIG. 1, in accordance with embodiments of the present invention. In this embodiment, application 104 (see FIG. 1) is the video streaming application. The process of FIG. 5 begins at step 500. In step 502, cognitive analyzer 116 (see FIG. 1) receives measurements of a user's eye movements from external monitor 112 (see FIG. 1).

In step 504, based on the measurements received in step 502, cognitive analyzer 116 (see FIG. 1) generates a model of a cognitive focus of attention of the user. The model includes a specification of a foveated region of a display of visual content being presented by the video streaming application by utilizing information in packets sent by server 108 (see FIG. 1) to the video streaming application. The foveated region corresponds to the visual fovea of the user (i.e., the foveated region is within the foveated vision of the user). In one embodiment, the model generated in step 504 includes a specification of the user's visual sensory apparatus including a specification of the resolution of the peripheral vision of the user and a specification of the resolution of the foveal vision of the user.

Cognitive analyzer 116 (see FIG. 1) represents the model generated in step 504 in a data structure and stores the data structure in a data repository (not shown in FIG. 1).

In step 506, cognitive analyzer 116 (see FIG. 1) determines an actual QoS of packets being sent by server 108 (see FIG. 1) to the video streaming application to present the display of the content of the video streaming application.

In step 508, based on the model generated in step 504, cognitive analyzer 116 (see FIG. 1) determines an adjustment to the actual QoS determined in step 506. The adjustment includes (1) a delay or a dropping of a first set of packets that specify a portion of the display outside the foveated region and (2) a maintenance of a rate of sending a second set of packets that specify the foveated region in the display (i.e., keeping the rate of sending the second set of packets unchanged). The first and second sets of packets are sent by server 108 (see FIG. 1) via network pipe 110 (see FIG. 1) to the video streaming application. The first set of packets that are delayed or dropped are not perceived by the user because cognitive analyzer 116 (see FIG. 1) ensures that the delay or dropping of the first set of packets provides a resolution of the portion of the display outside the foveated region that matches the resolution of the peripheral vision of the user. Therefore, the delayed or dropped first set of packets decrease the actual QoS of the video streaming application specifying the portions of the display outside the foveated region. While delaying or dropping the first set of packets specifying portions outside the foveated region, cognitive analyzer 116 (see FIG. 1) does not delay or drop the second set of packets that specify the foveated region, thereby maintaining as unchanged the QoS of the video streaming application specifying the portion of the display in the foveated region. Based on decreasing the QoS of specifying the portions of the display outside the foveated region and the maintenance of the QoS of specifying the foveated region of the display, the overall QoS of the video streaming application specifying the entire content in the display is decreased while the pQoS of the user is unchanged.

After step 508, QoS throttle 118 (see FIG. 1) performs the adjustment determined in step 508, which decreases a cost of sending the first set of packets from server 108 (see FIG. 1) to the video streaming application via network pipe 110 (see FIG. 1). The process of FIG. 5 ends at step 510.

Computer System

Figure 6:
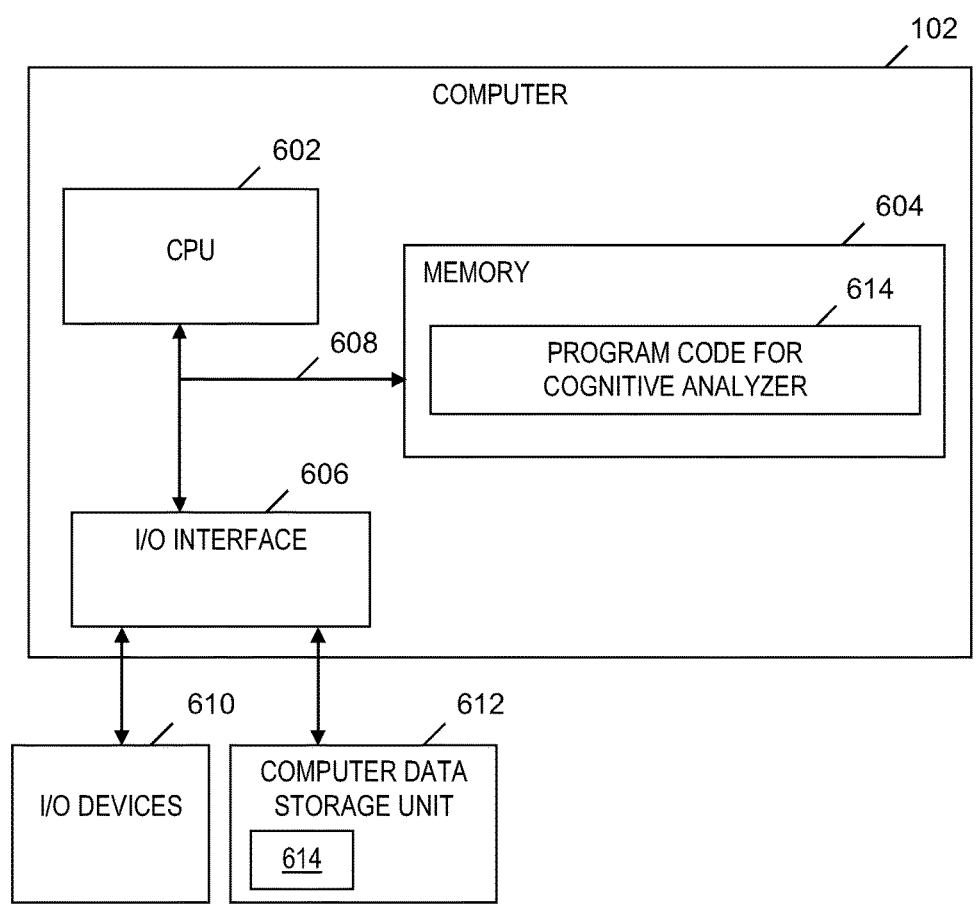
FIG. 6 is a block diagram of a computer that is included in the system of FIG. 1 and that implements the process of FIG. 2, FIG. 4A or FIG. 5, in accordance with embodiments of the present invention.

FIG. 6 is a block diagram of a computer that is included in the system of FIG. 1 and that implements the process of FIG. 2, FIG. 4A, or FIG. 5, in accordance with embodiments of the present invention. Computer 102 is a computer system that generally includes a central processing unit (CPU) 602, a memory 604, an input/output (I/O) interface 606, and a bus 608. Further, computer 102 is coupled to I/O devices 610 and a computer data storage unit 612. CPU 602 performs computation and control functions of computer 102, including carrying out instructions included in program code 614 to perform a method of managing a quality of service of an application running in a networked computing environment, where the instructions are carried out by CPU 602 via memory 604. CPU 602 may include a single processing unit, or be distributed across one or more processing units in one or more locations (e.g., on a client and server). Program code 614 includes program code for the software-based components of computer 102, such as cognitive analyzer 116 (see FIG. 1). Other program code (not shown) in memory 604 and/or computer data storage unit 612 includes program code for cognitive input system 114 (see FIG. 1) and application 104 (see FIG. 1).

Memory 604 includes a known computer readable storage medium, which is described below. In one embodiment, cache memory elements of memory 604 provide temporary storage of at least some program code (e.g., program code 614) in order to reduce the number of times code must be retrieved from bulk storage while instructions of the program code are carried out. Moreover, similar to CPU 602, memory 604 may reside at a single physical location, including one or more types of data storage, or be distributed across a plurality of physical systems in various forms. Further, memory 604 can include data distributed across, for example, a local area network (LAN) or a wide area network (WAN).

I/O interface 606 includes any system for exchanging information to or from an external source. I/O devices 610 include any known type of external device, including a display device, keyboard, etc. Bus 608 provides a communication link between each of the components in computer 102, and may include any type of transmission link, including electrical, optical, wireless, etc.

I/O interface 606 also allows computer 102 to store information (e.g., data or program instructions such as program code 614) on and retrieve the information from computer data storage unit 612 or another computer data storage unit (not shown). Computer data storage unit 612 includes a known computer readable storage medium, which is described below. In one embodiment, computer data storage unit 612 is a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 614 that includes instructions that are carried out by CPU 602 via memory 604 to manage a quality of service of an application running in a networked computing environment. Although FIG. 6 depicts memory 604 as including program code 614, the present invention contemplates embodiments in which memory 604 does not include all of code 614 simultaneously, but instead at one time includes only a portion of code 614.

Further, memory 604 includes an operating system (not shown) and may include other systems not shown in FIG. 6. In one embodiment, the operating system is the IBM® i operating system offered by International Business Machines Corporation located in Armonk, N.Y.

Storage unit 612 and/or one or more other computer data storage units (not shown) that are coupled to computer 102 may include a model of the cognitive focus of attention, which is generated in step 202 (see FIG. 2), step 404 (see FIG. 4A), or step 504 (see FIG. 5).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to managing a quality of service of an application running in a networked computing environment. Thus, an embodiment of the present invention discloses a process for supporting computer infrastructure, where the process includes providing at least one support service for at least one of integrating, hosting, maintaining and deploying computer readable code (e.g., program code 614) in a computer system (e.g., computer 102) including one or more processors (e.g., CPU 602), wherein the processor(s) carry out instructions contained in the code causing the computer system to manage a quality of service of an application running in a networked computing environment. Another embodiment discloses a process for supporting computer infrastructure, where the process includes integrating computer readable program code into a computer system including a processor. The step of integrating includes storing the program code in a computer readable storage device of the computer system through use of the processor. The program code, upon being executed by the processor, implements a method of managing a quality of service of an application running in a networked computing environment.

While it is understood that program code 614 for managing a quality of service of an application running in a networked computing environment may be deployed by manually loading directly in client, server and proxy computers (not shown) via loading a computer readable storage medium (e.g., computer data storage unit 612), program code 614 may also be automatically or semi-automatically deployed into computer 102 by sending program code 614 to a central server or a group of central servers. Program code 614 is then downloaded into client computers (e.g., computer 102) that will execute program code 614. Alternatively, program code 614 is sent directly to the client computer via e-mail. Program code 614 is then either detached to a directory on the client computer or loaded into a directory on the client computer by a button on the e-mail that executes a program that detaches program code 614 into a directory. Another alternative is to send program code 614 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 614 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of managing a quality of service of an application running in a networked computing environment. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 604 and computer data storage unit 612) having computer readable program instructions 614 thereon for causing a processor (e.g., CPU 602) to carry out aspects of the present invention.

The computer readable storage medium (i.e., computer readable storage device) can be a tangible device that can retain and store instructions (e.g., program code 614) for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium and a computer readable storage device, as used herein, are not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 614) described herein can be downloaded to respective computing/processing devices (e.g., computer 102) from a computer readable storage medium or to an external computer or external storage device (e.g., computer data storage unit 612) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 614) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 4A, or FIG. 5) and/or block diagrams (e.g., FIG. 1 and FIG. 6) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 614).

These computer readable program instructions may be provided to a processor (e.g., CPU 602) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 612) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 614) may also be loaded onto a computer (e.g., computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In one embodiment, memory 604 is ROM and computer 102 is a special purpose computer, where the ROM includes instructions of program code 614 that are executed by CPU 602 via ROM 604 to manage a quality of service of an application running in a networked computing environment.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer program product for managing a quality of service (QoS) of a video conferencing application, the computer program product comprising a computer readable storage device having program instructions stored in the computer readable storage device, the program instructions are executed by a central processing unit (CPU) of a computer system to cause the computer system to perform a method comprising the steps of:

the computer system determining a user is communicating with a first participant and not with one or more other participants, wherein the user, the first participant, and the one or more other participants are participants in a video conference provided by the video conferencing application via a computer network;

the computer system receiving data from (1) a speech recognition tool that recognizes speech of the user or the first participant or (2) a monitoring device that tracks eye movements of the user, wherein the step of determining the user is communicating with the first participant and not with the one or more other participants is based on the received data that recognizes the speech or tracks the eye movements of the user;

the computer system determining a resolution of peripheral vision of the user;

based on the user communicating with the first participant, the computer system generating a model of a cognitive focus of attention of the user, the model including a specification of the resolution of the peripheral vision of the user, the cognitive focus of attention being a region of a display presenting the video conference, the region including a face of the first participant;

the computer system determining a first actual QoS for other regions of the display that are outside the region that includes the face of the first participant;

the computer system determining a second actual QoS for the region that includes the face of the first participant;

based on the model of the cognitive focus of attention of the user, the computer system determining an estimation of a perceived QoS for the video conferencing application, the perceived QoS being a level of quality of service being perceived by the user via the cognitive focus of attention;

based on the model of the cognitive focus of attention of the user, including the specification of the resolution of the peripheral vision of the user, and further based on the first actual QoS for the other regions and the second actual QoS, the computer system determining an adjustment to the first actual QoS, without adjusting the second actual QoS, and while maintaining unchanged the estimation of the perceived QoS; and the computer system performing the adjustment by matching a resolution of the other regions of the display that are outside the region that includes the face of the first participant to the resolution of the peripheral vision of the user by delaying or dropping a set of packets that specify the other regions, the delayed or dropped set of packets not being perceived by the user based on the resolution of the other regions matching the resolution of the peripheral vision of the user, wherein the step of delaying or dropping the set of packets that specify the other regions includes reducing a video bit rate of the other regions that are outside the region that includes the face of the first participant.

2. The computer program product of claim 1, wherein the method further comprises the step of:

based on the adjustment to the first actual QoS being performed, the computer system decreasing a cost of sending the set of packets to the video conferencing application.

3. A computer system comprising:

a central processing unit (CPU);

a memory coupled to the CPU; and a computer readable storage device coupled to the CPU, the computer readable storage device containing instructions that are executed by the CPU via the memory to implement a method of managing a quality of service (QoS) of a video conferencing application, the method comprising the steps of:

the computer system determining a user is communicating with a first participant and not with one or more other participants, wherein the user, the first participant, and the one or more other participants are participants in a video conference provided by the video conferencing application via a computer network;

the computer system receiving data from (1) a speech recognition tool that recognizes speech of the user or the first participant or (2) a monitoring device that tracks eye movements of the user, wherein the step of determining the user is communicating with the first participant and not with the one or more other participants is based on the received data that recognizes the speech or tracks the eye movements of the user;

the computer system determining a resolution of peripheral vision of the user;

based on the user communicating with the first participant, the computer system generating a model of a cognitive focus of attention of the user, the model including a specification of the resolution of the peripheral vision of the user, the cognitive focus of attention being a region of a display presenting the video conference, the region including a face of the first participant;

the computer system determining a first actual QoS for other regions of the display that are outside the region that includes the face of the first participant;

the computer system determining a second actual QoS for the region that includes the face of the first participant;

based on the model of the cognitive focus of attention of the user, the computer system determining an estimation of a perceived QoS for the video conferencing application, the perceived QoS being a level of quality of service being perceived by the user via the cognitive focus of attention;

based on the model of the cognitive focus of attention of the user, including the specification of the resolution of the peripheral vision of the user, and further based on the first actual QoS for the other regions and the second actual QoS, the computer system determining an adjustment to the first actual QoS, without adjusting the second actual QoS, and while maintaining unchanged the estimation of the perceived QoS; and the computer system performing the adjustment by matching a resolution of the other regions of the display that are outside the region that includes the face of the first participant to the resolution of the peripheral vision of the user by delaying or dropping a set of packets that specify the other regions, the delayed or dropped set of packets not being perceived by the user based on the resolution of the other regions matching the resolution of the peripheral vision of the user, wherein the step of delaying or dropping the set of packets that specify the other regions includes reducing a video bit rate of the other regions that are outside the region that includes the face of the first participant.

4. The computer system of claim 3, wherein the method further comprises the step of:

based on the adjustment to the first actual QoS being performed, the computer system decreasing a cost of sending the set of packets to the video conferencing application.

\* \* \* \* \*